(12) United States Patent
Moore

(10) Patent No.: US 11,280,082 B1
(45) Date of Patent: Mar. 22, 2022

(54) FOUNDATION VENTILATOR REPAIR KIT

(71) Applicant: Donavan Lee Moore, Albany, OR (US)

(72) Inventor: Donavan Lee Moore, Albany, OR (US)

(73) Assignee: Donavan Lee Moore, Albany, OR (US)

( * ) Notice: Subject to any disclaimer, the term of this patent is extended or adjusted under 35 U.S.C. 154(b) by 268 days.

(21) Appl. No.: 16/718,161

(22) Filed: Dec. 17, 2019

Related U.S. Application Data

(60) Provisional application No. 62/810,360, filed on Feb. 25, 2019.

(51) Int. Cl.
*E04B 1/00* (2006.01)
*E04B 1/70* (2006.01)
*B01D 46/00* (2022.01)
*F24F 13/08* (2006.01)

(52) U.S. Cl.
CPC ........ *E04B 1/7076* (2013.01); *B01D 46/0005* (2013.01); *F24F 13/082* (2013.01)

(58) Field of Classification Search
CPC ... E04B 1/7076; B01D 46/0005; F24F 13/082
See application file for complete search history.

(56) References Cited

U.S. PATENT DOCUMENTS

| | | | | |
|---|---|---|---|---|
| 3,220,079 A * | 11/1965 | Aggson | ................. | E04B 1/7076 |
| | | | | 52/302.3 |
| 4,026,082 A | 5/1977 | Crofoot | | |
| 4,469,018 A * | 9/1984 | Taulman | ............... | E04B 1/7076 |
| | | | | 454/276 |
| 4,676,145 A * | 6/1987 | Allred | ...................... | F24F 7/00 |
| | | | | 454/276 |
| 5,460,572 A | 10/1995 | Waltz | | |
| 5,496,213 A | 3/1996 | Miller | | |
| 5,678,367 A | 10/1997 | Kline | | |
| 9,561,456 B2 * | 2/2017 | Simmons | .............. | F16B 11/006 |
| 9,758,982 B2 * | 9/2017 | Anderson, Jr. | .......... | E04B 1/92 |
| 2007/0010190 A1 * | 1/2007 | Butler | ................... | F24F 13/084 |
| | | | | 454/171 |
| 2015/0263499 A1 * | 9/2015 | Korcz | .................... | H02G 3/121 |
| | | | | 174/61 |

* cited by examiner

*Primary Examiner* — Steven O Douglas

(57) ABSTRACT

The present invention is an assembly of parts and a new utility to repair the detached or damaged screen or mesh of a foundation ventilator. The repair kit consists of a novel repair frame, a mesh or barrier, and an attachment means to attach the mesh or barrier to the frame after the frame has been installed into a ventilator. The open repair frame is made of corrosion resistant malleable material, and has a plurality of bendable tabs cut into the perimeter of the frame that can be crimped against the edges of a foundation ventilator in need of repair thereby holding the repair frame in place effecting a permanent repair once secured and a new barrier such as a mesh attached with any suitable attachment means.

3 Claims, 2 Drawing Sheets

FOUNDATION VENTILATOR REPAIR KIT

TECHNICAL FIELD OF THE INVENTION

This invention relates to devices for the ventilation of foundations of building structures, and to arrangements of matter and methods for repairing said devices.

BACKGROUND

Many homes and buildings have foundation ventilators also known as vents that are designed to allow airflow under the structure to prevent problems with moisture under the building as described in the referenced patents. These vents and ones like them are made of plastic with two or more openings circumscribed by one larger overall opening. These individual openings have narrow frame features recessed inside the individual openings to which is attached a mesh that allows air flow, and prevents animals, and other solids from entering the crawl space of the building. Examples of said narrow frame features can be found in U.S. Pat. No. 4,026,082 in FIG. 6 and said figure's features referenced by the numerals 3 and 8, U.S. Pat. No. 5,460,572 in FIG. 6 and said figure's feature referenced by the numeral 62, and U.S. Pat. No. 5,496,213 FIG. 3 and said figure's feature referenced by the numeral 42.

Over time the mesh that attaches to this feature can become loose, or even completely separate from the vent. Additionally, the installed mesh may be removed, or damaged by utility installation such as pipes, tubes and dryer vents through the ventilator. When this happens animals may enter the building through the foundation vent causing damage to the building.

Current obvious methods of solving this problem are cutting a block of wood to press fit into the opening, or inserting a foam block to press fit into the opening. These repair methods are inadequate because they remove the utility of ventilation under the structure intended by said ventilator, may fit poorly and become dislodged, or become damaged by animals to gain access to the crawl space of the building.

In so far as I am aware, the patent documents that I have identified disclose no art related to the repair of said ventilators or other ventilators of similar construction. Additionally no prior art has been discovered with the composition of matter or the utility to be described.

BRIEF SUMMARY OF THE INVENTION

I have now invented a Foundation Ventilator Repair Kit that is designed to repair foundation ventilators that have openings circumscribed by one larger overall vent frame whose mesh has separated from the said narrow frame feature noted in the BACKGROUND section of this document. The foundation ventilator repair kit consists of a novel repair frame that is designed to attach to the existing narrow frame feature of said ventilator by means of novel bendable tabs, a replacement mesh and screws to fasten a new/replacement mesh to the repair frame.

Alternatively the replacement mesh could be substituted with other barrier designs to allow for penetration of utilities such as dryer vents, pipes and tubes. The mesh or barrier could also be attached to said repair frame using rivets, zip ties, plastic fasteners, or other suitable attachment methods.

Additionally, the process by which this new composition of matter is utilized is new. First, a user inspects said ventilator opening, as noted in the BACKGROUND section of this document, to be repaired and identifies which said bendable tabs should be used to fasten the said repair frame to the said ventilator's narrow frame feature. Second, the user bends the appropriate bendable tabs. Third, the user inserts the repair frame into the said individual ventilator opening pressing the frame against the front surface of said ventilator's narrow frame feature (the feature that the old mesh has separated from). Fourth, the said user uses a tool to crimp the bendable tabs against the rear surface of the said ventilator narrow frame feature. Fifth, the user attaches the mesh or other barrier design to the repair frame preferably by means of screws or using other fastening means as noted previously.

It is clearly stated that although the utility of this invention has been described using specific references to prior art, these references have been made for clarity, and are not intended to set the limits of the claims to only those specific referenced items. The claims to be made extend to all ventilator frames and open frames with said narrow frame features used to attach a mesh or barrier that may become dislodged, torn, broken, separated, or otherwise unsuitable for its intended use.

BRIEF DESCRIPTION OF THE DRAWINGS

The invention may be better understood by reference to the accompanying drawings, wherein.

DETAILED DESCRIPTION

Figure 1:
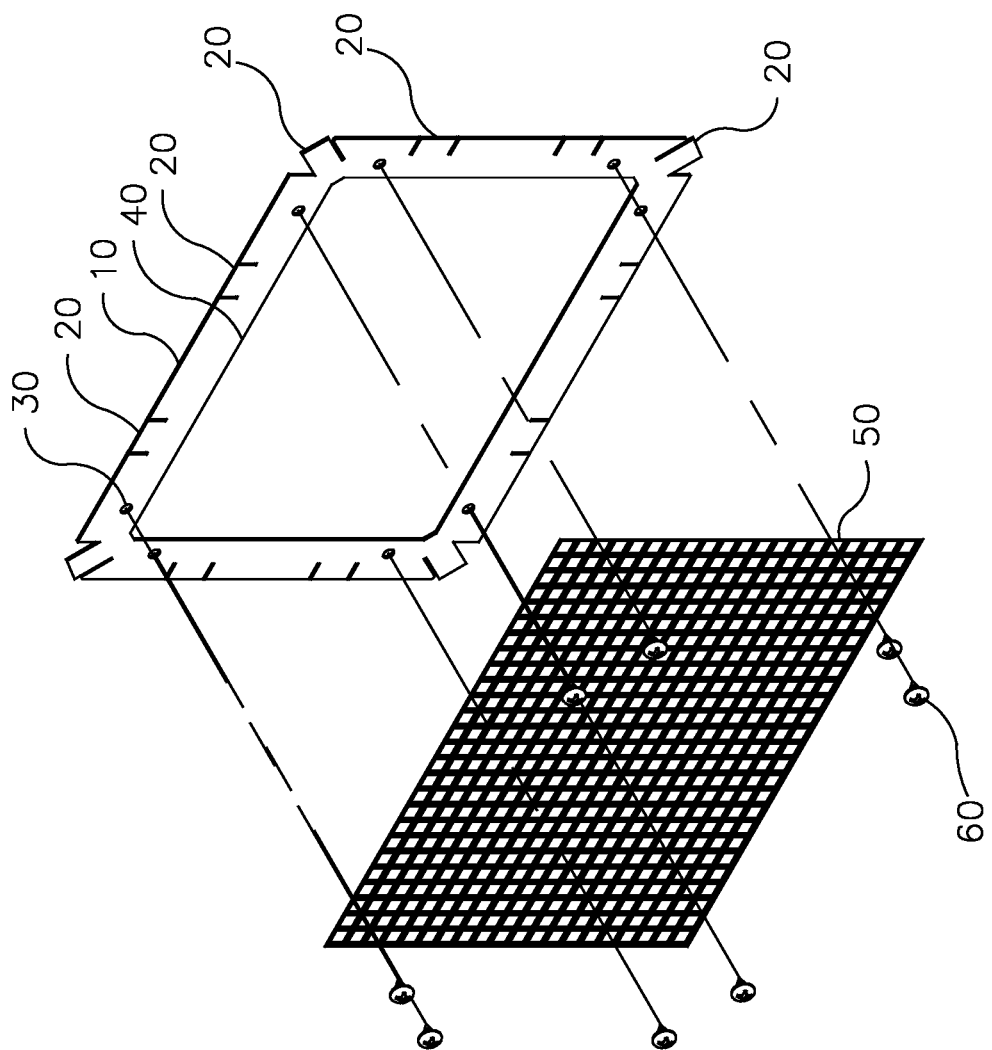
FIG. 1 is an isometric exploded view of said invention and the elements that it is assembled from the following elements: Element (10) is the new repair frame unmodified by the user. Elements noted (20) are bendable tabs used to crimp onto foundation ventilators being repaired. Elements (30) are holes to accept the barrier fastening means. Element (40) is an opening in the new repair frame (10) to allow tools to pass through. Element (50) is a barrier, depicted as a mesh, or screen suited to the repair. Elements (60) are the attachment means to connectively attach the new repair frame (10) and the barrier (50) together, shown here as screws to attaching the barrier (50) to the repair frame (10).

As shown in FIG. 1, the Foundation Ventilator Repair Kit (the device of the present invention) is characterized by three [3] major components, as follows.

As shown in FIG. 1, [1] Element (10) is the new repair fame element or kit component of the present invention; [2]

Element (50) is the barrier element or kit component of the present invention, and [3] Element (60) is the fastening means element or kit component of the present invention. Further, note that Element 20, the bendable tabs are a feature/function on/of the repair frame (10).

The preferred embodiment of the repair frame (10) is characterized by the following attributes:

The repair frame is manufactured from a material that is malleable (e.g. pliable, plastic, workable, shapable, or moldable) yet resists deformation enough to hold its shape. Thin gauge metal between 0.0100 inches and 0.0625 inches is the best material to use for this application.

It is preferred that the repair frame is made of a material that is corrosion resistant such as galvanized steel, aluminum, stainless steel or another corrosion resistant metal. Corrosion resistance obviously enhances or provides longevity and permanence for the repair by ensuring that the repair frame is durable under normal use and weather conditions.

It has an opening (40) allowing the passage of tools through the interior of the repair frame. The opening is essential to allow a tool to reach in and crimp the bendable tabs to be described later in this section. The repair frame (10) opening is shown in the drawing of FIG. 1, as Element (40)—the open space inside the repair frame.

Figure 2:
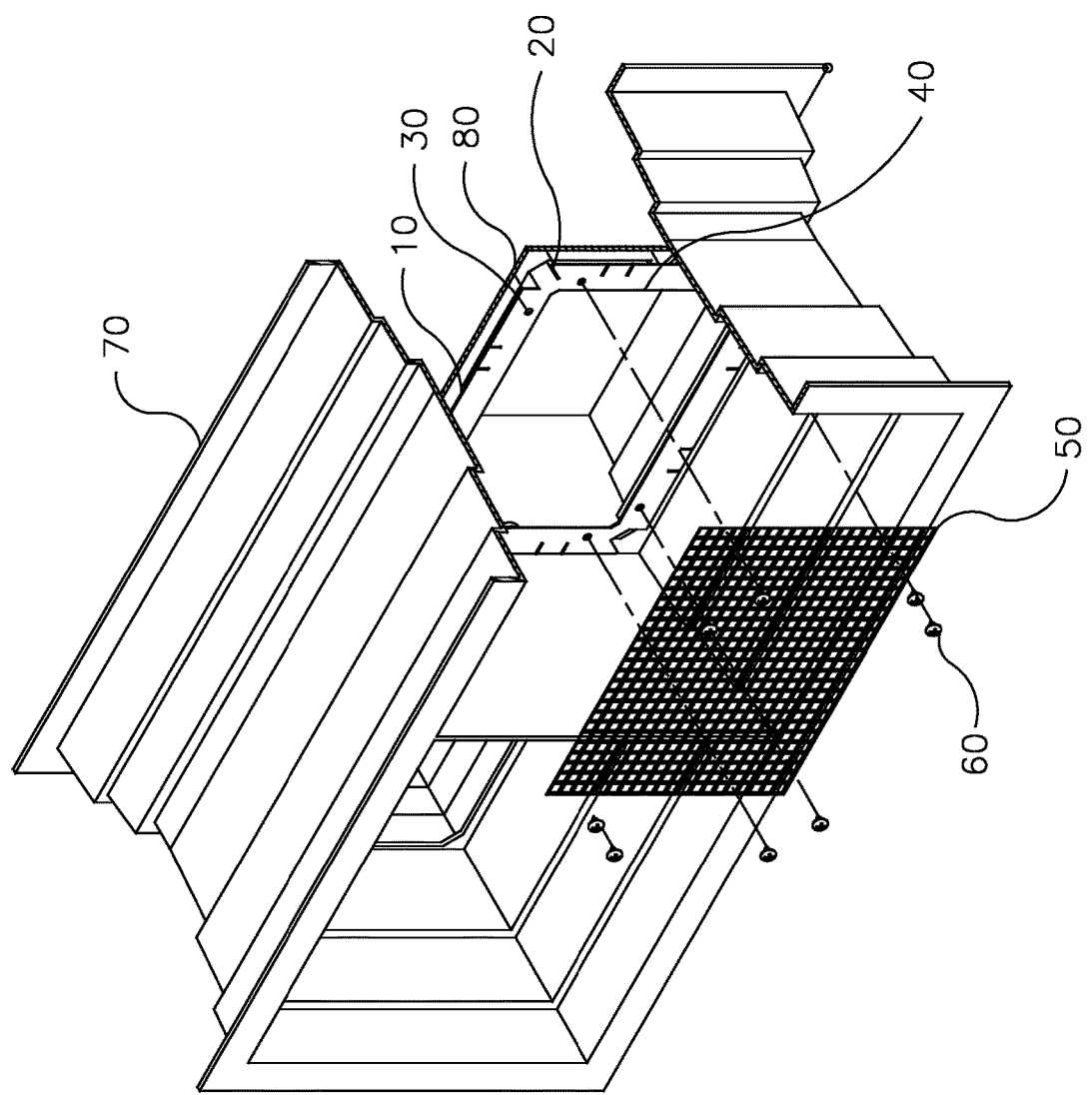
FIG. 2 is a isometric, quarter section exploded assembly view depicting the repair frame partially inserted into the foundation ventilator (70) with four of the repair frame's bendable tabs (20) in their bent position (two of the bent bendable tabs are obscured by the foundation ventilator itself) and slipping inside the said narrow frame feature (80) described in the BACKGROUND section of this document using a representative foundation ventilator. As in FIG. 1, above, Element (10) is the new repair frame with four of the repair frame's bendable tabs (20) bent for insertion into the narrow frame feature (80) by the user. Elements noted (20) are bendable tabs used to crimp onto foundation ventilators being repaired. Elements (30) are holes to accept the barrier fastening means. Element (40) is an opening to allow tools to pass through the repair frame (10). Element (50) is a barrier. Elements (60) are the attachment means to connectively attach the repair frame (10) and the barrier (50), here shown as screws. Element (70) is a representative foundation ventilator. Element (80) is the representative foundation ventilator's narrow frame feature.

Attention is directed to FIG. 2. The repair frame is sized so as to slip fit into the void that contains the narrow frame feature that attaches the damaged mesh of a foundation ventilator (70) and yet its large enough not to pass through said narrow frame feature (80) when oriented planar to the said narrow frame feature, and pressed against the existing said narrow frame feature (80).

Attention is directed to FIG. 2. The repair frame has bendable tabs (20) around the outside perimeter of the repair frame. A bendable tab may be created by cutting reliefs in the repair frame perpendicular to the outside perimeter of the frame. These reliefs should extend far enough into the material of the frame so that when the tabs are bent until they are almost perpendicular to the planar surface of the repair frame (10) with a tool, the bent tabs can pass through the interior of the narrow frame feature (80) of a foundation ventilator (70) while the unbent portion of the repair frame still does not pass through the narrow frame feature of the foundation ventilator to be repaired.

In the presented preferred embodiment, the reliefs would be spaced about 0.375 inch apart to create a bendable tab (20), and multiple tabs would be strategically located around the perimeter to allow the user to select which tabs to bend based on field conditions of the damaged foundation ventilator (70). Typically there would be a tab at each corner of the repair frame, and two more tabs equally spaced along the sides between the corners to provide additional bendable tabs around the perimeter of the repair frame. The addition or deletion of any number of bendable tabs (20) as is functional for the intended application of this invention does not alter the claims. The repair frame (10) is functional with any plurality of bendable tabs designed, stamped, or cut into the repair frame (10). From a minimum of a single bendable tab (20) to hold the repair frame on one side up to any number needed to securely hold the repair frame (10) to an existing ventilator (70) in need of repair.

Attention is directed to FIG. 1. It is essential that the repair frame (10) have an attachment means (60) to connectively attach a barrier (50) to the repair frame (10) after its installation. In the preferred embodiment, these would be holes cut into the frame intended to accept screws that are used to fasten the barrier (50) to the repair frame (10).

Beginning construction of the repair frame is accomplished by measuring the opening size dimensions to be repaired and cutting out a repair frame (10) with enough bendable tabs (20) to hold the repair frame (10), a barrier (50), and the attachment means (60) to the ventilator (70) in need of repair. Construction of the repair frame could be accomplished, as it is in the preferred embodiment by using a computer numerically controlled metal cutting laser to cut out the desired shape of the repair frame (10) from a suitable malleable material with sufficient wear characteristics (metal fatigue) so as to ensure stiffness and position retention of the bendable tabs (20) after they are crimped or tightened into position to secure the repair frame (10) into a ventilator (70) needing repair Alternative constructions of the repair frame could consist of the following attributes:

The repair frame could be made of some other malleable material other than metal such as a firm rubber substance, or malleable plastic. Any material which is rigid and exhibits sufficient fatigue characteristics so as to allow the bendable tabs (20) created on a repair frame (10) to bend back and forth a few times and still retain sufficient material shape and holding strength when crimped into position for installation after first having been bent out of the way for insertion into a ventilator (70) needing repair one or more times. Obviously, the repair frame could be made of non-corrosion resistant metal, however that could lead to premature failure of the device due to probable environmental conditions affecting the device.

The bendable tab quantity around the perimeter could be increased or reduced from a single bendable tab to any plurality. A smaller number of tabs than recommended in the preferred embodiment may lead to an inferior design due to lack of options for the user in the field to have an existing tab in the proper place on the repair frame (10) to secure it to a ventilator (70), and excessive tabs may reduce the ability of the unbent portion of the frame to hold its shape during the crimping process as a result of too many cuts in its planar surface.

The angle of the reliefs cut in the repair frame to produce the bendable tabs may be something other than perpendicular to the outside perimeter edge of the frame to increase and enhance installation options in the field.

The width between the reliefs cuts (e.g. the width of the bendable tabs (20)) in the repair frame used to produce the bendable tabs may be any distance other than that described herein in the preferred embodiment as needed to hold the repair frame (10) in place in other applications and at other sizes.

The means for attaching a barrier could be any attachment means designed to or suitable for connected attachment of the repair frame (10) and the barrier (50) to include but not be limited to attachment means such as rivets, zip ties, or plastic locking tabs.

Attention is directed to FIG. 2. In the case where existing utilities are passing through the damaged foundation ventilator, an alternative construction of the frame would be to cut one side of the repair frame so that it can be opened up around the existing utilities' pipes or tubes, and then returned to its original shape after being inserted into the damaged foundation ventilator (70) and its tabs crimped against the narrow frame feature (80) of said foundation ventilator (70). Obviously after preforming the steps noted in this paragraph, the steps to secure the frame to the narrow frame feature would be the same as those described in the preferred embodiment.

Alternative constructions of the repair frame could be accomplished by using a computer numerically controlled metal cutting water jet, developing a proper die, and stamping the frames out of metal, casting the proper shape, hand cutting, or many other forms of metal or plastic forming available today.

The preferred embodiment of the barrier is characterized by the following attributes:

Where only ventilation is required as determined by the user, the barrier portion of the repair kit would be a mesh made of corrosion resistant metal such as galvanized steel, stainless steel, or aluminum (e.g.—with a maximum of 0.215 inch×0.215 inch square openings between 0.035 inch diameter wire woven to make the wire mesh).

Attention is directed to FIG. 1. The barrier cut from a mesh sheet with the properties described in the previous paragraph so as to be larger than the opening to allow passage of tools (40), and the relationship between the barrier openings and the holes to accept the barrier fastening means (30) would be designed to match and allow easy attachment of the barrier (50) to the repair frame (10).

Where integration of items such as dryer vents and other utilities passing through the damaged foundation ventilator is desired, instead of a barrier made of mesh, the user could use a barrier of solid metal preferably made of corrosion resistant metal (e.g. between 0.010 inch thick and 0.0625 inch thick). This solid metal barrier would have perforations made in the barrier to match the needed utilities, and would also have holes designed to mount the barrier to the repair frame using the preferred attachment method described above.

Alternative constructions of the barrier could be characterized by the following attributes:

The barrier construction noted in the preferred embodiment could consist of smaller or larger sizes of mesh openings and wire than described. For example to keep animals and other undesirable solids out of the crawl space while maintaining a suitable attachment method. Additionally the barrier could be made of any other reasonably durable and corrosion resistant material such as plastic or a firm rubber substance. Other obvious embodiments of the barrier can be any suitable screening material to include, but not be limited to: wire cloth, net, netting, network, tracery, reticulation; web, webbing, lattice, latticework, lacework, openwork, tatting, filigree, trellis, screen, plexus, tangle. Additionally the mesh could be made of non-corrosive resistant material, however due a possible outdoor environment, the longevity of the device might be compromised.

In the case where existing utilities are passing through the damaged foundation ventilator, an alternative construction of the barrier as described in the preferred embodiment could be to cut the barrier along the center line of the perforations to allow the new barrier to fit around the utilities without the need to remove them. Obviously the barrier would then be attached to the repair frame as described in the preferred embodiment.

Alternatively the barrier material could be plastic, firm rubber, wood or any other reasonably solid and strong, yet thin substance.

The preferred embodiment of the fastening means is characterized by the following attributes:

Attention is directed to FIG. 1. Sheet metal screws (60) that are made of a corrosion resistant material such as zinc plated steel, galvanized steel, nickel plated steel, or stainless steel sized according to trade size #8.

Alternative constructions of the fastening means could be characterized by the following attributes.

The fastening means as described in the preferred embodiment could be any suitable fastening means. Including, but not limited to machine screws, socket head cap screws, wood screws and others made of any type of commonly manufactured screw material.

The fastening means as described in the preferred embodiment could also be accomplished by obvious embodiments such as wire ties, zip ties, rivets, plastic clips, plastic fasteners, glue, hook and loop, tacks, or any other suitable attachment means which would hold the new mesh and the repair frame securely together.

Usage of the foundation repair kit consists of the following steps in order.

The repair kit is completely disassembled.

The user identifies an existing foundation ventilator that is damaged by having a detached or loose mesh or barrier which could allow animals or solids to pass through and into the crawl space of the structure.

The user would ensure that the existing damaged mesh is completely removed from the existing foundation ventilator.

Attention is directed to FIG. 2. The user examines the existing foundation ventilator's narrow frame feature (80) looking for sections of the narrow frame feature that may be damaged, or unsuitable for attachment, and choosing alternative tabs (20) on the repair frame (10) to attach to undamaged portions of the said narrow frame feature. The user ideally would choose at least one bendable tab per edge of the narrow frame feature, but could choose multiple tabs for even greater attachment strength if the user so chooses.

The user then bends the selected tabs (20) almost perpendicular to the planar surface of the new repair frame (10) to about eighty angular degrees from the planar surface of said repair frame.

The user inserts the repair frame into the damaged foundation ventilator (70) pressing the planar surface of the new repair frame against the said narrow frame feature (80) while the bent tabs (20) pass through the interior of the said narrow frame feature.

The user then uses a tool to bend the selected tabs (20) so that they press against the surface of the narrow frame feature that is on the side of the foundation ventilator that is inside the structure. This action creates a clamping force between the unbent portion of the repair frame (10) that is pressing against the surface of the narrow frame feature (80) that is oriented toward the outside of the structure, and the bent tab pressing against the surface of the narrow frame feature (80) that is oriented toward the inside of the structure, with the narrow frame feature in between the bent tab (20) and the unbent portion of the frame (10). Once all of the selected tabs around the frame have been bent as noted, the new repair frame will be firmly secured to the narrow frame feature.

The user then matches the openings in the barrier (50) up to the attachment holes (30) in the new repair frame.

The user then inserts the fastening means (60) thereby fastening the mesh or barrier (50) to the repair frame (10), completing the assembly and has now finished repairing the formerly damaged foundation ventilator.

The present invention may be embodied in other forms without departing from its spirit or essential characteristics. Further, it is noted, that there may well be applicability of the present invention in fields not herein described Although the invention has been explained in relation to its preferred embodiment, it is to be understood that many other possible modifications and variations can be made without departing from the spirit and scope of the invention.

The invention claimed is:

1. A frame device, made of a material that is malleable yet resists deformation enough to hold the material's shape, characterized by an opening large enough to allow a tool to pass through the frame; and a plurality of pre-cut bendable tabs positioned on each of the edges of said frame for the purpose of connecting said frame to an existing open air ventilator by means of a clamping force between the tabs and the frame, whereby the tool that passes through the frame is capable of bending the pre-cut bendable tabs.

2. A foundation ventilator repair kit comprising the frame device of claim 1, further comprising a barrier, and a means to connectively attach said barrier to said frame.

3. A method of using the foundation ventilator repair kit of claim 2 to repair a foundation ventilator by connectively attaching said frame device to a foundation ventilator in need of repair.

* * * * *